US011853576B2

(12) United States Patent
Butt et al.

(10) Patent No.: US 11,853,576 B2
(45) Date of Patent: Dec. 26, 2023

(54) DELETING DATA ENTITIES AND DEDUPLICATION STORES IN DEDUPLICATION SYSTEMS

(71) Applicant: Hewlett Packard Enterprise Development LP, Houston, TX (US)

(72) Inventors: John Butt, Weston-super-Mare (GB); Noel Rodrigues, Bristol (GB); David Bebawy, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 281 days.

(21) Appl. No.: 17/447,281

(22) Filed: Sep. 9, 2021

(65) Prior Publication Data
US 2023/0073371 A1     Mar. 9, 2023

(51) Int. Cl.
*G06F 3/06* (2006.01)
(52) U.S. Cl.
CPC ............ *G06F 3/0641* (2013.01); *G06F 3/067* (2013.01); *G06F 3/0608* (2013.01); *G06F 3/0652* (2013.01); *G06F 3/0659* (2013.01)
(58) Field of Classification Search
None
See application file for complete search history.

(56) References Cited

U.S. PATENT DOCUMENTS

| 10,007,795 | B1 | 6/2018 | Chung et al. |
| 10,248,336 | B1* | 4/2019 | Koujalagi ............ G06F 3/0608 |
| 11,281,577 | B1* | 3/2022 | Karumbunathan ... G06F 3/0688 |
| 2017/0206353 | A1 | 7/2017 | Jai et al. |
| 2018/0034835 | A1 | 2/2018 | Iwanir et al. |
| 2018/0253358 | A1 | 9/2018 | Gu |
| 2019/0108340 | A1 | 4/2019 | Bedhapudi et al. |
| 2019/0108341 | A1 | 4/2019 | Bedhapudi et al. |
| 2019/0109870 | A1 | 4/2019 | Bedhapudi et al. |
| 2020/0065485 | A1 | 2/2020 | Pandey et al. |
| 2020/0099699 | A1 | 3/2020 | Saad |
| 2020/0201827 | A1 | 6/2020 | Chacko |
| 2020/0320040 | A1 | 10/2020 | Butt |
| 2022/0342847 | A1* | 10/2022 | Singh ................... G06F 16/128 |

FOREIGN PATENT DOCUMENTS

WO     WO-2016186602     11/2016

\* cited by examiner

*Primary Examiner* — Prasith Thammavong
*Assistant Examiner* — Edmund H Kwong
(74) *Attorney, Agent, or Firm* — Hewlett Packard Enterprise Patent Department

(57) ABSTRACT

Examples described herein relate to deletion of data entities in a deduplication system. Examples may maintain entries in a housekeeping queue, each entry including a priority value and a total unshared chunk size of a data entity to be deleted from the deduplication system. Examples may delete the data entities corresponding to the entries including a low priority value from the deduplication system. Examples may determine whether an available storage capacity of the deduplication system is sufficient after deleting the data entities corresponding to the entries including the low priority value. Examples may delete a data entity corresponding to an entry including a high priority value and a largest total unshared chunk size if the available storage capacity is insufficient.

20 Claims, 12 Drawing Sheets

FIG. 1B

HOUSEKEEPING DIRECTORY 190
- IDENTIFIER (ID-13) 131-13
- IDENTIFIER (ID-11) 131-11
- IDENTIFIER (ID-30) 131-30
- IDENTIFIER (ID-2) 131-2

FIG. 1C

HOUSEKEEPING QUEUE 140

| IDENTIFIER 131 | PRIORITY VAL 133 | TOT UN CH SIZE 134 |
|---|---|---|
| ID-13 | LOW | 83 GB |
| ID-11 | HIGH | 97 GB |
| ID-30 | HIGH | 108 GB |
| ID-2 | LOW | 122 GB |

FIG. 1D

HOUSEKEEPING QUEUE 140

| IDENTIFIER 131 | PRIORITY VAL 133 | TOT UN CH SIZE 134 |
|---|---|---|
| ID-13 | LOW | 83 GB |
| ID-2 | LOW | 122 GB |
| ID-11 | HIGH | 97 GB |
| ID-30 | HIGH | 108 GB |

FIG. 1E

HOUSEKEEPING DIRECTORY 190
- IDENTIFIER (ID-11) 131-11
- IDENTIFIER (ID-30) 131-30

FIG. 1F

HOUSEKEEPING QUEUE 140

| IDENTIFIER 131 | PRIORITY VAL 133 | TOT UN CH SIZE 134 |
|---|---|---|
| ID-11 | HIGH | 97 GB |
| ID-30 | HIGH | 108 GB |

HOUSEKEEPING QUEUE 140

| IDENTIFIER 131 | PRIORITY VAL 133 | TOT UN CH SIZE 134 |
|---|---|---|
| ID-30 | HIGH | 108 GB 143 |
| ID-11 | HIGH | 97 GB 142 |

*FIG. 1G*

HOUSEKEEPING DIRECTORY 190

[ IDENTIFIER (ID-11) 131-11 ]

*FIG. 1H*

HOUSEKEEPING QUEUE 140

| IDENTIFIER 131 | PRIORITY VAL 133 | TOT UN CH SIZE 134 |
|---|---|---|
| ID-11 | HIGH | 97 GB 142 |
| | | |

*FIG. 1I*

HOUSEKEEPING QUEUE 140

| IDENTIFIER 131 | PRIORITY VAL 133 | TOT UN CH SIZE 134 | TIME THR 135 |
|---|---|---|---|
| ID-11 | HIGH | 97 GB 142 | 1800 |
| ID-1 | HIGH | 197 GB 145 | - |

*FIG. 1J*

HOUSEKEEPING DIRECTORY 190

[ IDENTIFIER (ID-11) 131-11 ]
[ IDENTIFIER (ID-1) 131-1 ]

HOUSEKEEPING QUEUE 140

| IDENTIFIER | PRIORITY VAL | TOT UN CH SIZE | TIME THR |
|---|---|---|---|
| ID-11 | LOW | 97 GB | - |
| ID-1 | HIGH | 197 GB | - |
| | | | |
| | | | |

131 → IDENTIFIER
133 → PRIORITY VAL
134 → TOT UN CH SIZE (142)
135 → TIME THR (145)

FIG. 1M

HOUSEKEEPING DIRECTORY 190

[ IDENTIFIER (ID-1) 131-1 ]

FIG. 1N

HOUSEKEEPING QUEUE 140

| IDENTIFIER | PRIORITY VAL | TOT UN CH SIZE | TIME THR |
|---|---|---|---|
| ID-1 | HIGH | 197 GB | - |
| | | | |
| | | | |
| | | | |

131 → IDENTIFIER
133 → PRIORITY VAL
134 → TOT UN CH SIZE
135 → TIME THR (145)

HOUSEKEEPING DIRECTORY 290

[ IDENTIFIER (BI-13) 231-13 ]
[ IDENTIFIER (BI-11) 231-11 ]
[ IDENTIFIER (BI-30) 231-30 ]
[ IDENTIFIER (BI-2) 231-2 ]

*FIG. 2B*

HOUSEKEEPING QUEUE 140

| IDENTIFIER 231 | PRIORITY VAL 233 | TOT UN CH SIZE 234 |
|---|---|---|
| BI-13 | LOW | 83 GB — 141 |
| BI-11 | HIGH | 97 GB — 142 |
| BI-30 | HIGH | 108 GB — 143 |
| BI-2 | LOW | 63 GB — 144 |

*FIG. 2C*

HOUSEKEEPING QUEUE 140

| IDENTIFIER 231 | PRIORITY VAL 233 | TOT UN CH SIZE 234 |
|---|---|---|
| BI-2 | LOW | 63 GB — 144 |
| BI-13 | LOW | 83 GB — 141 |
| BI-11 | HIGH | 97 GB — 142 |
| BI-30 | HIGH | 108 GB — 143 |

*FIG. 2D*

CONTAINER INDEX 261 (CI-261) 243

| CHUNK SIG 241 | REF COUNT 242 | LOC DATA |
|---|---|---|
| SIG-1 | 2 | LOC 251 — 261-1 |
| SIG-2 | 0 | LOC 252 — 261-2 |
| SIG-3 | 1 | LOC 253 — 261-3 |
| SIG-4 | 1 | LOC 254 — 261-4 |

CONTAINER 271

CHUNKS 280 → | 201 | 203 | 204 | 205 |

HOUSEKEEPING DIRECTORY 290

[ IDENTIFIER (BI-11) 231-11 ]
[ IDENTIFIER (BI-30) 231-30 ]

FIG. 2G

HOUSEKEEPING QUEUE 140

| IDENTIFIER | PRIORITY VAL | TOT UN CH SIZE |
|---|---|---|
| BI-11 | HIGH | 97 GB |
| BI-30 | HIGH | 108 GB |

FIG. 2H

HOUSEKEEPING QUEUE 140

| IDENTIFIER | PRIORITY VAL | TOT UN CH SIZE |
|---|---|---|
| BI-30 | HIGH | 108 GB |
| BI-11 | HIGH | 97 GB |

FIG. 2I

HOUSEKEEPING DIRECTORY 290

[ IDENTIFIER (BI-11) 231-11 ]

FIG. 2J

HOUSEKEEPING QUEUE 140

| IDENTIFIER | PRIORITY VAL | TOT UN CH SIZE |
|---|---|---|
| BI-11 | HIGH | 97 GB |

FIG. 3B

HOUSEKEEPING DIRECTORY 390

- DEDUPLICATION STORE (DS-13) 200-13
- DEDUPLICATION STORE (DS-11) 200-11
- DEDUPLICATION STORE (DS-18) 200-18
- DEDUPLICATION STORE (DS-1) 200-1

FIG. 3C

HOUSEKEEPING QUEUE 340

| IDENTIFIER 331 | PRIORITY VAL 333 | TOT UN CH SIZE 334 |
|---|---|---|
| DS-13 | LOW | 1046 GB |
| DS-11 | HIGH | 1297 GB |
| DS-18 | LOW | 908 GB |
| DS-1 | HIGH | 197 GB |

FIG. 3D

HOUSEKEEPING QUEUE 340

| IDENTIFIER 331 | PRIORITY VAL 333 | TOT UN CH SIZE 334 |
|---|---|---|
| DS-13 | LOW | 1046 GB |
| DS-18 | LOW | 908 GB |
| DS-1 | HIGH | 197 GB |
| DS-11 | HIGH | 1297 GB |

FIG. 3E

HOUSEKEEPING DIRECTORY 390

- DEDUPLICATION STORE (DS-11) 200-11
- DEDUPLICATION STORE (DS-1) 200-1

FIG. 3F

HOUSEKEEPING QUEUE 340

| IDENTIFIER 331 | PRIORITY VAL 333 | TOT UN CH SIZE 334 |
|---|---|---|
| DS-1 | HIGH | 197 GB |
| DS-11 | HIGH | 1297 GB |

HOUSEKEEPING QUEUE 340

| IDENTIFIER 331 | PRIORITY VAL 333 | TOT UN CH SIZE 334 (→344) |
|---|---|---|
| DS-1 | HIGH | 197 GB |
| | | |
| | | |

*FIG. 3H*

HOUSEKEEPING DIRECTORY 390

| DEDUPLICATION STORE (DS-1) 200-1 |
|---|

*FIG. 3I*

HOUSEKEEPING QUEUE 340

| IDENTIFIER 331 | PRIORITY VAL 333 | TOT UN CH SIZE 334 |
|---|---|---|
| DS-11 | HIGH | 1297 GB (→342) |
| DS-1 | HIGH | 197 GB (→344) |
| | | |

DELETING DATA ENTITIES AND DEDUPLICATION STORES IN DEDUPLICATION SYSTEMS

BACKGROUND

A client computing device, such as a host server or the like, may store data in a primary storage array, and may execute workloads against the data stored in the primary storage array. The data stored in the primary storage array may be backed up in a backup appliance, separate from the client computing device and the primary storage array, for redundancy and data protection purposes, or the like. The backup appliance may store data in a deduplicated form such that the data is stored more compactly than on the primary storage array. In some examples, the backup appliance may receive instructions from the client computing device or the primary storage array to delete or restore the data.

BRIEF DESCRIPTION OF THE DRAWINGS

The following detailed description references the drawings, wherein:

FIGS. 1B, 1E, 1H, 1K, and 1M are block diagrams of a housekeeping directory of the deduplication system of FIG. 1A at different points in time, in accordance with an example;

FIGS. 1C, 1D, 1F, 1G, 1I, 1J, 1L, and 1N are block diagrams of a housekeeping queue of the deduplication system of FIG. 1A at different points in time, in accordance with an example;

FIGS. 2B, 2F, and 2I are block diagrams of a housekeeping directory of the deduplication system of FIG. 2A at different points in time, in accordance with an example;

FIGS. 2C, 2D, 2G, 2H, and 2J are block diagrams of a housekeeping queue of the deduplication system of FIG. 2A at different points in time, in accordance with an example;

FIG. 2E is a block diagram of a container index and container of the deduplication system of FIG. 2A, in accordance with an example;

FIGS. 3B, 3E, and 3I are block diagrams of a housekeeping directory of the deduplication system of FIG. 3A at different points in time, in accordance with an example;

FIGS. 3C, 3D, 3F, 3G, and 3H are block diagrams of a housekeeping queue of the deduplication system of FIG. 3A at different points in time, in accordance with an example;

DETAILED DESCRIPTION

As noted above, the backup appliance may receive instructions to store data for redundancy and data protection purposes. The backup appliance (referred to herein as a "deduplication system") may perform a process of deduplication on a collection of data (referred to herein as a "stream" of data or a "data stream") and store the data in a more compact and deduplicated form in a storage device of the deduplication system.

Figure 1A:
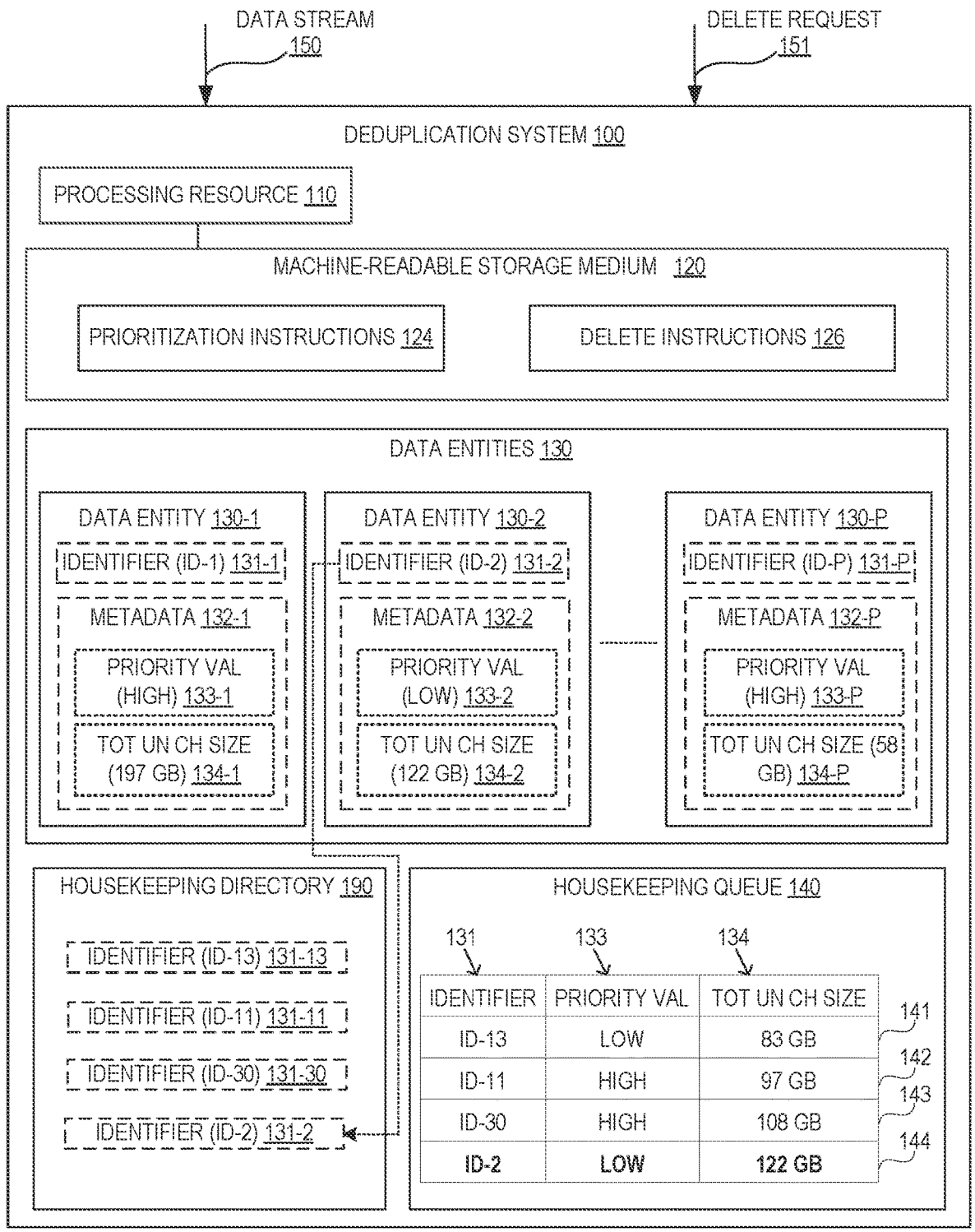
FIG. 1A is a block diagram of a deduplication system that is to delete data entities, in accordance with an example.

FIG. 1A is a block diagram of an example deduplication system 100, in accordance with examples described herein. The deduplication system 100 (also referred to herein as a "system") may receive one or more data streams from a client computing device (e.g., a host server or storage array) coupled with deduplication system 100. A data stream 150 may correspond to user object(s) (e.g., file(s), a file system, volume(s), or any other suitable collection of data). The deduplication system 100 may store deduplicated representations of the data stream 150 using data structures including metadata, containers, container indexes, and directories. Examples of these data structures will be described in detail in relation to FIGS. 2A and 3A.

The deduplication system 100 described herein may perform a process of deduplication on the data stream 150 that includes dividing the data stream 150 into fixed or variable length sections referred to herein as "chunks", identifying "duplicate" chunks having content identical to that of other chunks, storing one (full or compressed) copy of each chunk not identified as being a duplicate of an already-stored chunk and, for duplicate chunks, storing references (e.g., pointers) to the stored copy of the chunk without storing the same chunk again. In this manner, a deduplication process may often avoid storing duplicates of the same chunk in the deduplication system 100.

The deduplication system 100 may store the deduplicated representations of the data streams 150. The deduplicated representations may include data entities 130 (labeled as data entities 130-1 through 130-P (where "P" is an integer greater than 2)), respectively, that reference containers of data chunks via container indexes. In the examples described herein, each of the data entities 130-1 to 130-P may comprise or correspond to a backup item or a collection of backup items. The backup items, container indexes, and containers of a single deduplication domain may be referred to herein as a "deduplication store". Each data entity 130-1 to 130-P may include a respective identifier 131-1 to 131-P. The identifiers 131-1 to 131-P may associate user object(s) provided for backup with respective data entities 130-1 to 130-P forming part of the deduplicated representation(s) of the respective user object(s) in the deduplication system 100.

In some examples, the deduplication system 100 may receive a request 151 to delete or erase a data entity stored in the deduplication system 100. The deduplication system 100 may initiate a delete operation, if the request 151 is received from a known or legitimate client computing device, such as a host server coupled to the deduplication system 100. To perform the delete operation, the deduplication system 100 may maintain a queue (referred to herein as housekeeping queue 140), which may include a list of entries, each indicating a data entity to be deleted from the deduplication system 100. In the housekeeping queue 140, each entry may include an identifier 131 of a data entity to be deleted from the deduplication system 100. On receiving a request 151 to delete a data entity, system 100 may add an entry corresponding to the data entity to the bottom of the housekeeping queue 104. The entry may include the identifier of that data entity, for example. The system 100 may subsequently (e.g., as a background operation) select an entry in the housekeeping queue 140 and delete the data entity associated with the identifier in the selected entry from the deduplication system 100. Thereafter, system 100 may remove the selected entry (having the identifier associated with the deleted data entity) from the housekeeping queue 140. The system 100 may proceed to select one or more additional entries in the housekeeping queue 140 and perform data entity deletion and removal of the selected entries in a similar manner. In some examples, the system 100 may restore a data entity associated with one of the identifiers before the data entity is deleted and the associated entry is removed from the housekeeping queue 140.

In other examples, system 100 may reject the request 151 to delete a data entity, if the request 151 is received from an unknown client, such as a host server that is not coupled to the system 100, to ensure the security of the data stored therein. In such examples, the system 100 may not initiate the delete operation. In some examples, a client computing device coupled to the deduplication system 100 may be targeted by malware, such as in a ransomware attack. In such examples, the malware may gain access to the client computing device and encrypt the data stored on a primary storage array that is the client computing device or that is coupled to the client computing device. In such an attack, it is possible that the encrypted data cannot be decrypted by the client computing device unless a private key of the ransomware attacker is obtained. Further, the malware may send requests 151 from the client computing device to delete one or more data entities stored in the system 100 (i.e., backups of the data received from the storage array or other client computing device). The system 100 may accept the requests 151 and perform the delete operations as the requests 151 would appear to be legitimate instructions from a known client computing device. In such examples, the system 100 may delete data entities using the delete operation process as described above. Once the data entities are deleted using the delete operation, it may not be possible to readily restore the data entities.

To address these issues, examples described herein may enable prioritized deletion of data entities in deduplication systems. Examples described herein may maintain entries in a housekeeping queue, each entry including a priority value and a total unshared chunk size of a data entity to be deleted from the deduplication system. The priority value indicates whether the data entity is a high priority data entity or a low priority data entity. The low priority data entities may be prioritized for earlier deletion from the deduplication system than high priority data entities. In some examples, after the deletion of the low priority data entities, one or more high priority data entities may be deleted based on an available storage capacity of the deduplication system. For example, if the available storage capacity of the deduplication system is insufficient, a high priority data entity having a largest total unshared chunk size (as indicated in the housekeeping queue) may be deleted. In this manner, the examples described herein allow freeing up a maximum amount of available storage capacity while deleting a minimum number of high priority data entities from the deduplication system.

In this manner, examples described herein may enable deferring the deletion of high priority data entities from the deduplication system, which may provide a larger window of opportunity for the restoration of high priority data entities from the deduplication system when they are targeted for deletion by malware, for example.

Examples described herein may also enable assigning a time threshold value for the high priority data entities. On expiry of the time threshold value in the housekeeping queue, the high priority data entity may be treated as a low priority data entity and prioritized for earlier deletion from the deduplication system, for example. In this manner, examples described herein may ensure that the storage capacity of the deduplication system is sufficient to allow ingestion of new data streams. In examples described herein, a data entity represented in a housekeeping queue being prioritized for deletion may mean that it is to be deleted earlier than data entities represented in a housekeeping queue that are not prioritized for deletion.

FIG. 1A is a block diagram of a deduplication system 100 that is to delete data entities, in accordance with an example described herein. The deduplication system 100 may be implemented by a computing device (such as a storage array, a backup appliance, or the like) including a processing resource 110 and a machine-readable storage medium 120 storing (e.g., encoded with) at least instructions 124 and 126 that are executable by the processing resource 110 of the deduplication system 100. Functionalities of system 100 described herein may be performed by processing resource 110 of system 100 executing instructions (e.g., instructions 124, 126, etc.) stored on machine-readable storage medium 120.

Examples will be described below in relation to FIG. 1A and FIGS. 1B-1N, where FIGS. 1B-1N depict block diagrams of either example housekeeping queue or housekeeping directories of FIG. 1A at different points in time.

As described above, in the example of FIG. 1A, the deduplication system 100 may store deduplicated representations of the data streams 150, the deduplicated representations including data entities 130 (labeled as data entities 130-1 through 130-P). Each of the data entities 130-1 to 130-P may be a backup item. In various examples, the data entities may be stored on persistent storage (not shown in FIG. 1A) made up of one or more persistent storage devices. In such examples, all data and metadata of the deduplicated representations (e.g., containers, container indexes, data entities, total unshared chunk size, etc.) may be stored on the persistent storage. Persistent storage may be implemented by one or more non-volatile storage devices, such as one or more hard disk drives (HDDs), one or more solid-state drives (SSDs), or any other suitable non-volatile storage device, or a combination thereof. In some examples, the deduplication system 100 may include all of the storage device(s) implementing persistent storage storing data entities, or one or more of the storage device(s) may be part of other computing device(s) separate from the deduplication system 100 and with which deduplication system 100 may communicate.

Each of data entities 130-1 to 130-P may include a respective identifier 131-1 to 131-P and respective metadata 132-1 to 132-P. Although, in some sections of the description hereinafter, the operations, components, and functions of data entities are described with reference to the data entity 130-1, similar operations, components, and functions may be applicable in respect of the other data entities 130-2 to 130-P. The identifier 131-1 (having example content "ID-1" shown in parentheses) may associate a user object provided for backup and the corresponding data entity 130-1 stored, as part of deduplicated representation of that user object, in deduplication system 100. Identifiers 131 may serve as references to the respective data entities 130 of which they are a part and to the metadata 132 of the respective data entities 130 of which they are a part. For example, the identifier 131-1 (ID-1) may serve as a reference to data entity 130-1 and to metadata 132-1 of the data entity 130-1 of which identifier 131-1 is a part. The metadata 132-1 may include at least a priority value 133-1 and a total unshared chunk size 134-1 of the data entity 130-1. In the example of FIG. 1A, the priority values 133 may be values (e.g., from a predetermined set of possible values, such as "high" and "low") set by a user, such as an owner of the user object corresponding to the data entity 130 containing it. For example, priority value 133-1 may be "high". In some examples, a priority value 133 may be set before or after a corresponding data stream is stored as a data entity 130 in the deduplication system 100. The total unshared chunk size 134 of a data entity 130 may refer to the total storage capacity occupied by the chunks exclusively referenced by the data entity 130 (i.e., the chunks that are not referenced or shared by any other data entity of the deduplication domain or deduplication store). The storage capacity may refer to the amount of storage space available on one or more storage devices (e.g., hard disk drives (HDDs), solid state drives (SSDs), or the like) of the deduplication system 100. In the example of FIG. 1A, the total unshared chunk size 134-1 of data entity 130-1 may be 197 GB.

The deduplication system 100 may receive, from a client computing device (referred to hereinafter as a "client"), a request 151 to delete a data entity. The request 151 may be a request to delete a backup item corresponding to a data entity or a deduplication store (i.e., all data entities of the deduplication store). In some examples, in response to the request to delete a data entity in the deduplication system 100, system 100 may move a reference to the data entity (e.g., its identifier) from a user-accessible directory to a housekeeping directory 190. In other examples, system 100 may move the data entity itself from the user-accessible directory to the housekeeping directory 190. The housekeeping directory 190 may refer to a set of files storing the references to data entities (or the data entities itself) that have been added after receiving respective request(s) to delete those data entities, and before they are actually deleted. In the example of FIG. 1A, in response to request(s) to delete, for example, data entities among data entities 130-1 to 130-P), system 100 may store in housekeeping directory 190 references to the data entities requested to be deleted. In the example of FIG. 1A, the stored references include an identifier 131-13 (with a value "ID-13"), an identifier 131-11 (with a value "ID-11"), and an identifier 131-30 (with a value "ID-30"). In some examples, system 100 may move the metadata associated with (e.g., contained in) the data entities to the housekeeping directory 190. Once the identifiers of the data entities (or the data entities themselves) are moved to the housekeeping directory 190, system 100 may restrict access to them so that the moved data entities, or the identifiers 131 and metadata 132 thereof, cannot be used to reconstruct a full version of the corresponding backup item(s).

In response to the request 151 to delete a data entity, the prioritization instructions 124 may insert an entry for the data entity into a housekeeping queue 140. The housekeeping queue 140 may maintain a respective entry for each data entity to be deleted from the deduplication system 100. The housekeeping queue 140 includes one or more entries (e.g., 141, 142, 143, 144, etc.), each entry including an identifier and metadata associated with a data entity requested to be deleted from the deduplication system 100 (but not yet deleted). The metadata of the entries in the housekeeping queue 140 may include priority values 133 and total unshared chunk sizes 134. In some examples, each priority value may be set or modified after the metadata and identifiers are inserted into the housekeeping queue 140. As shown in FIG. 1A, the housekeeping queue 140 includes the identifiers 131 (e.g., ID-13, ID-11, and ID-30) and respective priority values 133 and respective total unshared chunk size 134. In the examples described herein, separate housekeeping queues may be used for deleting individual backup items (e.g., individual data entities) and for deleting entire deduplication stores (e.g., all data entities in a deduplication domain). Alternatively, a shared housekeeping queue may include both data entities and deduplication stores requested to be deleted in other examples.

Continuing the example of FIG. 1A, the deduplication system 100 may receive a request 151 to delete the data entity 130-2. In response, the prioritization instructions 124 may move the identifier 131-2 (having a value of "ID-2") of data entity 130-2 to the housekeeping directory 190 (as shown by the dotted arrow in FIG. 1A). The prioritization instructions 124 may then insert a new entry 144 into the housekeeping queue 140 that specifies the associated identifier 131-2 (value "ID-2") for data entity 130-2, a priority value 133 (with a value of "LOW") for data entity 130-2, and a total unshared chunk size 134 (with a value of "122 GB") for the data entity 130-2. FIG. 1B and FIG. 1C depict use of the housekeeping directory 190 and housekeeping queue 140 by system 100 in response to receiving the request to delete the data entity 130-2.

Continuing the example of FIG. 1A, subsequent to adding identifier 131-2 to housekeeping directory 190 and adding entry 144 to housekeeping queue 140, system 100 may perform a process to delete data entities represented in the housekeeping queue 140 (e.g., via a background process). In such examples, the prioritization instructions 124 may (e.g., as part of the background process) select, from housekeeping queue 140, entries including a low priority value for deletion of the corresponding data entities. For example, referring to FIG. 1C, instructions 124 may select entries 141 and 144 on the basis of having low priority values 133, and the data entities referenced by those entries (which may be referred to as "low priority data entities") may be prioritized for deletion before the data entities referenced by the entries having high priority values 133 (which may be referred to as "high priority data entities"). In some examples, the prioritization instructions 124 may sort the housekeeping queue 140 according to the priority values such that the entries with low priority values 133 are arranged for selection prior to entries including high priority values 133, as depicted in FIG. 1D. As depicted in FIGS. 1C and 1D, entry 141 includes identifier ID-13, a low priority value, and a total unshared chunk size of 83 GB; entry 142 includes identifier ID-11, a high priority value, and a total unshared chunk size of 97 GB; entry 143 includes identifier ID-30, a high priority value, and a total unshared chunk size of 108 GB; and entry 144 includes identifier ID-2, a low priority value, and a total unshared chunk size of 122 GB.

The delete instructions 126 may delete, from system 100, the data entities associated with the selected entries 141, 144 having low priority values. For example, the delete instructions 126 may delete the low priority data entities (including data entity 130-2), identified by the identifiers ID-13 and ID-2 of entries 141 and 144, from the housekeeping directory 190 as depicted in FIG. 1E. The delete instructions 126 may delete the identifiers ID-13 and ID-2 from the housekeeping directory 190 after deletion of the data entities. The data entity and associated metadata cannot be restored once identifiers are deleted from the housekeeping directory 190.

In response to deleting the data entities, the delete instructions 126 may remove the entries 141 and 144, including identifiers ID-13 and ID-2, from the housekeeping queue 140. FIG. 1F depicts the housekeeping queue 140 after the deletion of the low priority data entities and removal of associated entries 141, 144 from the housekeeping queue 140. In this manner, the prioritization instructions 124 and delete instructions 126 may delete each low priority data entity from the deduplication system 100 and remove from housekeeping queue 140 the entries associated with each of the deleted low priority data entities. As a result, the housekeeping queue 140 (as depicted in FIG. 1F) may include the entries associated with the high priority data entities.

In response to the deletion of the low priority data entities from the deduplication system and the removal of the entries associated with the low priority data entities from the housekeeping queue 140, the prioritization instructions 124 may determine whether sufficient storage capacity is available in the system 100. For example, the prioritization instructions 124 may determine whether an available storage capacity of system 100 is less than a threshold storage capacity. In response to determining that the available storage capacity of system 100 is less than the threshold storage capacity, the prioritization instructions 124 may identify an entry including the largest total unshared chunk size in the housekeeping queue 140. In some examples, the identification may include sorting the housekeeping queue according to the total unshared chunk size (e.g., descending order of the total unshared chunk size). FIG. 1G depicts a housekeeping queue 140 including entries associated with the high priority data entities and sorted in descending order of the total unshared chunk size. In such an example, entry 143 having the largest total unshared chunk size (108 GB) is positioned first in (i.e., at the top of) the housekeeping queue 140 for deletion.

The delete instructions 126 may delete the high priority data entity associated with the largest total unshared chunk size from the deduplication system 100. For example, instructions 126 may delete, from the housekeeping directory 190, the data entity referenced by identifier 131-30 (ID-30) and delete the identifier 131-30 (ID-30) from the housekeeping directory. FIG. 1H depicts the housekeeping directory 190 after deletion of the identifier 131-30 (ID-30) and the associated data entity. Further, the delete instructions 126 may remove the entry 143 including the identifier ID-30 from the housekeeping queue 140. FIG. 1I depicts the housekeeping queue 140 after deleting the high priority data entity associated with the largest total unshared chunk size and removing the corresponding entry 143. In some examples, the prioritization instructions 124 may further determine whether the available storage capacity in system 100 is less than the threshold. In response to determining that the available storage capacity in system 100 is not less than the threshold, the deduplication system 100 may not perform further deletion of the data entities indicated in the housekeeping queue 140. In other examples, if the available storage capacity in system 100 is less than the threshold, the delete instructions 126 may delete the data entity referenced by identifier 131-11 ("ID-11") and remove the associated entry 142.

In some examples, entries in the housekeeping queue 140 may include time threshold values 135, as depicted in FIG. 1J. The time threshold values 135 may be received as an input to the deduplication system 100 from the client. For example, the time threshold values 135 may be received from the client computing device coupled to the system 100 or inputted manually via a user interface (e.g., Graphical User Interface) of the deduplication system. In some examples, the time threshold value 135 may be set before or after a corresponding data stream is stored as a data entity 130 in the deduplication system 100. The time threshold values 135 may be a part of the metadata 132 of the data entity 130, for example. Based on expiry of the time threshold value 135 associated with an entry, the priority value of that entry (and the corresponding data entity) may be modified. For example, the prioritization instructions 124 may determine whether time elapsed after the insertion of the entry into the housekeeping queue is equal to or greater than the time threshold value. If the time elapsed is equal to or greater than the time threshold value for the entry, the prioritization instructions 124 may modify the priority value of the entry from a high priority value to a low priority value.

Further, the deduplication system 100 may continue receiving new delete requests 151 over time. For example, the deduplication system 100 may receive a request to delete the data entity 130-1. In response, the prioritization instructions 124 may move the identifier ID-1 associated with the data entity 130-1 to the housekeeping directory 190 (as depicted in FIG. 1K). As depicted in FIG. 1J, a new entry 145 may be created in the housekeeping queue 140 specifying the identifier ID-1, a high priority value, and a total unshared chunk size of 197 GB. The time threshold value may not be set for the data entity 130-1, and therefore, there may not be a limited amount of time that data entity 130-1 may continue to be treated as high priority.

For the data entity associated with ID-11 and entry 142, on expiry of the time threshold value (e.g., 1800 seconds) from the time of insertion of that entry into the housekeeping queue, system 100 may change the priority value of entry 142 from high to low. FIG. 1L depicts the housekeeping queue 140 in which entry 142 (associated with the identifier ID-11) has a low priority value. The prioritization instructions 124 and 126 may perform prioritization and deletion of the data entity associated with ID-11 as described earlier. FIGS. 1M and 1N depict the housekeeping directory 190 and housekeeping queue 140 after deleting the data entity associated with entry 142 and removing the entry 142.

In some examples, the data entities (e.g., data entity 130-1) or references to the data entities (e.g., identifier ID-1) in the housekeeping directory 190 may be recoverable by the client. In the example of FIG. 1M, system 100 may restore the data entity 130-1 by moving the identifier ID-1 from the housekeeping directory 190 back to a user-accessible directory. In other examples, system 100 may delete the data entity 130-1 (or its reference ID-1) from the housekeeping directory 190 if the storage capacity is less than the threshold.

Figure 2A:
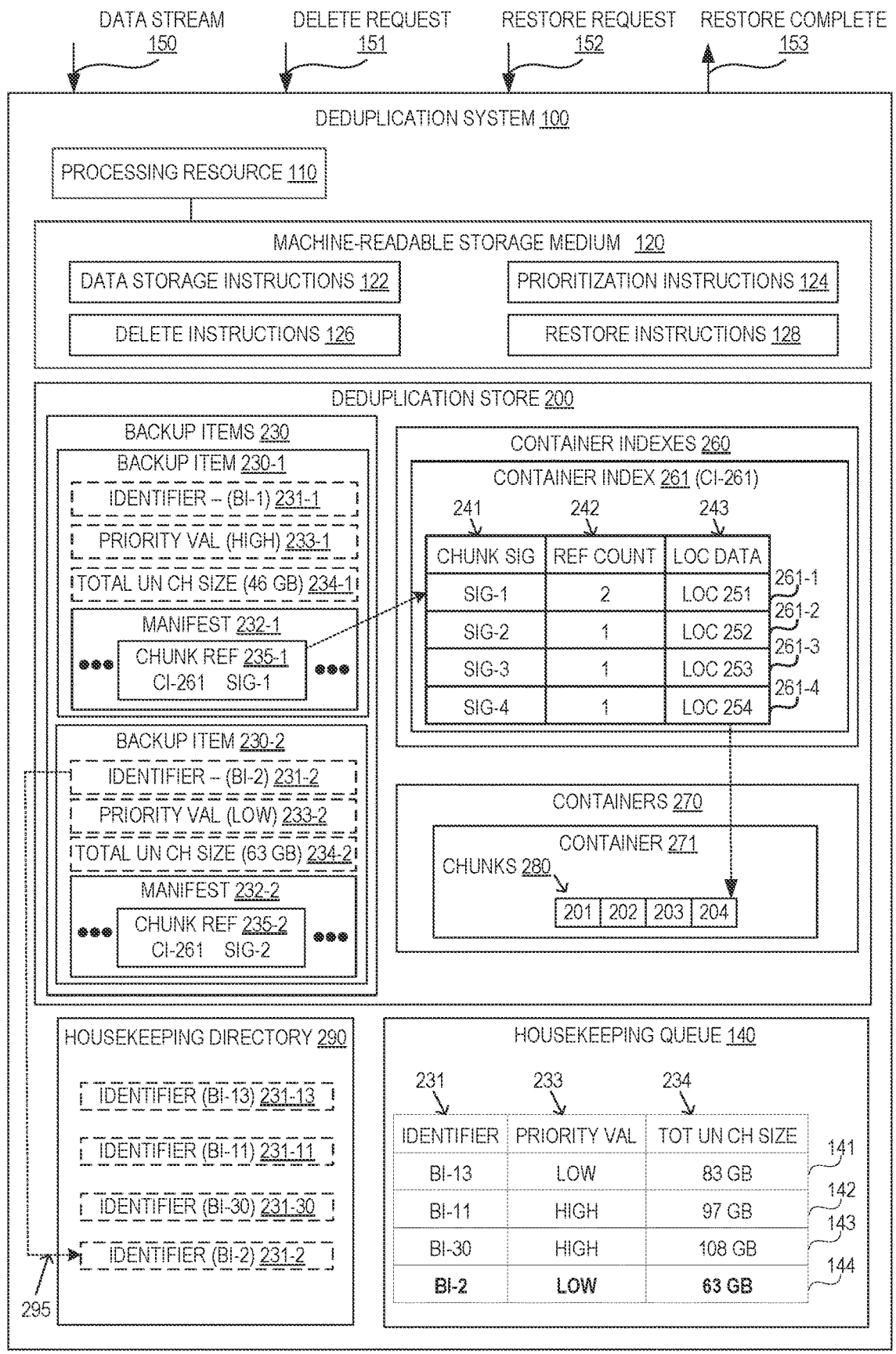
FIG. 2A is a block diagram of a deduplication system that is to delete backup items in a deduplication store, in accordance with an example.

FIG. 2A is a block diagram of the deduplication system to delete backup items, in accordance with an example. The deduplication system 100 may store deduplicated representations of a data stream 150 using data structures in a deduplication store. Deduplication system 100 may include one or more deduplication stores. In the example of FIG. 2A, deduplication store 200 may include backup items 230, container indexes 260, and containers 270.

In the example of FIG. 2A, data storage instructions 122 (e.g., when executed by the processing resource 110) may store chunks 280 of the data stream 150 in the container(s) 270 of the deduplication store 200 and may store chunk signatures and chunk location data for each of the chunks in container index(es) 260 of the deduplication store 200. The data storage instructions 122 may create a container index 261 (of container indexes 260) and may store, in the container index 261, a plurality of entries 261-1, 261-2, 261-3, 261-4 including the chunk signatures 241, the reference counts 242, and the location data 243. Each of the other container indexes (not shown in FIG. 2A) of the container indexes 260 may contain the same types of information as described herein in relation to container index 261.

Each entry (hereinafter referred to as "container index entry") of the container index 261 may include a chunk signature 241, reference count 242, location data 243, and other information that corresponds to the chunk signature of that container index entry and the chunk represented by that chunk signature. For example, the container index entry 261-1 includes a chunk signature SIG-1 that represents a chunk 201 of container 271. The container index entry 261-1 also includes a reference count of 2, and location data 251, each corresponding to the chunk signature SIG-1 of the container index entry 261-1. For ease of illustration herein, the chunk signatures are represented with reference symbols having a format of "SIG-X", where "SIG-" is a prefix indicating a chunk signature, and "X" is one or more numbers identifying a particular chunk signature value. Chunk signatures represented by the same reference symbol represent identical chunk signatures (e.g., a chunk signature "SIG-1" is identical to another chunk signature "SIG-1"), and chunk signatures represented by different reference symbols are different (i.e., not identical) chunk signatures (e.g., chunk signature "SIG-1" is not identical to chunk signatures "SIG-2", "SIG-3", etc.). Although reference symbols of the form "SIG-X" are used herein for ease of illustration, examples described herein may use any suitable representation for the actual chunk signatures (e.g., binary representation, hexadecimal representation, etc.).

In examples described herein, a backup item "references" a given chunk signature of a given container index when a manifest of the backup item (or a portion of that backup item) includes the given chunk signature and an indication that the given chunk signature is associated with the given container index (e.g., via an identifier for the given container index associated with the given chunk signature in the manifest). In the examples described herein, a backup item "references" a given chunk when the backup item includes a reference to the chunk signature in a container index entry including location data for the given chunk in the container corresponding to the container index. In such examples, a backup item may be said to reference a given chunk via a chunk signature for the chunk in a container index, for example.

In the example of FIG. 2A, the data storage instructions 122 may also store and update reference counts 242 for each container index entry of each of the container indexes 260. In such examples, each reference count in a container index entry (and corresponding to the chunk signature of that container index entry) may indicate how many references to the chunk represented by the chunk signature of that container index entry (i.e., the chunk pointed to by that container index entry) are made by the various manifests of the backup items of the deduplication store 200 (e.g., via the chunk signature for the chunk in the container index). In the example of FIG. 2A, the data storage instructions 122 may also store location data 243 for each container index entry of each of the container indexes 260. In such examples, each instance of the location data 243 in a container index entry (and corresponding to the chunk signature of that container index entry) may specify the location of the respective chunk in the corresponding container (e.g., via an offset and length, or the like).

Although, for illustrative purposes, FIG. 2A shows two backup items 230 (230-1 and 230-2), one container index 261, four container index entries 261-1, 261-2, 261-3, 261-4 and one container 271 of the deduplication store 200, the deduplication store 200 may include any suitable number of backup items, any suitable number of container indexes and entries, and any suitable number of containers.

In the example of FIG. 2A, a backup item may include one or more manifests (or "portions"), each including a plurality of references to the chunks that make up a client object, or a portion of the client object, with the chunk references being in the order in which the chunks themselves make up the client object. Backup item 230-1 includes a manifest 232-1 comprising a plurality of chunk references (including chunk reference 235-1). Each chunk reference may include a chunk identifier, such as a chunk arrival number or chunk signature (e.g., "SIG-1"), and a container index identifier for a container index having an entry for the chunk identifier. In the example of FIG. 2A, manifest 232-1 includes a chunk reference 235-1 that includes a container index identifier CI-261 referring to container index 261, and a chunk signature "SIG-1" (that is also in an entry of container index 261) as its chunk reference (though in other examples the chunk reference may be an arrival number or other identifier of a chunk). Backup item 230-2 includes a manifest 232-2 comprising a plurality of chunk references, including a chunk reference 235-2 that includes container index identifier CI-261 referring to container index 261, and a chunk signature "SIG-2" (that is also in an entry of container index 261) as its chunk reference (though other types of chunk reference may be used). In some examples, backup items may also include other properties, including a priority value and a total unshared chunk size as described above. Backup item 230-1 may include an indication 233-1 of a high priority value, high and an indication 234-1 of a total unshared chunk size of 46 GB. Backup item 230-2 may include an indication 233-2 of a low priority value, and an indication 234-2 of a total unshared chunk size of 63 GB.

As noted above, the container index 261 may correspond to container 271. In such examples, each container index entry of container index 261 may correspond to one of the chunks 280 of container 271. For example, container index entry 261-1 may include chunk signature SIG-1 representing chunk 201 and may include other data corresponding to chunk signature SIG-1, including a reference count of two for chunk 201, and location data 251 indicating the location of chunk 201 in container 270 (e.g., via an offset and length, or any other suitable data). The container index entry 261-2 may include a chunk signature SIG-2 representing a chunk 202 and may include other data corresponding to chunk signature SIG-2, including a reference count of one for chunk 202, and location data 252 indicating the location of chunk 202 in container 270.

The container index entry 261-3 may include a chunk signature SIG-3 representing a chunk 203 and may include other data corresponding to chunk signature SIG-3, including a reference count of one for chunk 203, and location data 253 indicating the location of chunk 203 in container 271. Similarly, the container index entry 261-4 may include chunk signature SIG-4 representing chunk 204 and may include other data corresponding to chunk signature SIG-4, including a reference count of one for chunk 204, and location data 254 indicating the location of chunk 204 in container 271 (as illustrated by the dotted arrow between them in FIG. 2A).

Although for ease of explanation, the examples are described herein in relation to container indexes including container index entries, each including a chunk signature and other data corresponding to the chunk signature, other examples may implement the container indexes in any suitable manner and may associate each chunk signature with the other data corresponding to it in any suitable manner.

The deduplication system 100 may include a housekeeping directory 290 for storing references to the backup items, which have been requested for deletion (e.g., from a client). The deduplication system 100 may move references to the backup items among the backup items 230 from a user-accessible directory to the housekeeping directory 290 in response to receiving requests to delete those backup items. In the example of FIG. 2A, the housekeeping directory 290 may include identifiers BI-13, BI-11, and BI-30 of backup items that are to be deleted from the deduplication system. Such backup items may not be accessible to the client unless the identifiers are restored (or moved back) to the user-accessible directory. Additionally, such backup items may not be visible to the client and/or used for reconstructing a full version of the user object corresponding to the backup item unless the respective identifiers are restored (or moved back) to the user-accessible directory.

The deduplication system 100 may include the housekeeping queue 140 (as described earlier in relation to FIG. 1A) including entries 141, 142, 143, 144 for storing the identifiers 231, priority values 233, and total unshared chunk size 234 of the backup items requested for deletion (i.e., backup items stored in the housekeeping directory 290). As shown in FIG. 2A, each entry in the housekeeping queue 140 specifies an identifier 231 and metadata (priority value 233 and total unshared chunk size 234) of a backup item to be deleted from the deduplication system 100. The entry 141 includes the identifier BI-13, a low priority value, and total unshared chunk size of 83 GB; the entry 142 includes the identifier BI-11, a high priority value, and total unshared chunk size of 97 GB; the entry 143 includes the identifier BI-30, low priority value, and total unshared chunk size of 108 GB.

Examples related to the deletion of backup items will now be described in relation to FIGS. 2A-2J. In the example of FIG. 2A, the deduplication system 100 may receive a request 151 to delete one of the backup items 230. In response to the delete request 151, the prioritization instructions 124 may insert a new entry 144 into the housekeeping queue 140 that specifies the identifier, priority value, and total unshared chunk size of the backup item. Additionally, the identifier of the backup item may be moved to the housekeeping directory 290. In the example of FIG. 2A, the request 151 may be a request to delete the backup item 230-2. In such an example, the prioritization instructions 124 may move a reference to (e.g., identifier BI-2 of) the backup item 230-2 to the housekeeping directory 290 (as shown by the dotted arrow 295) and include the identifier (BI-2) and the metadata including the low priority value (LOW) and the total unshared chunk size (63 GB) in the entry 144 of the housekeeping queue 140. FIG. 2B depicts a housekeeping directory 290, which includes the identifier BI-2 231-2 of the backup item 230-2 in response to receiving the delete request 151. After the identifier BI-2 231-2 of the backup item 230-2 is moved to the housekeeping directory 290, the client may not be able to view, access, open, read, and/or retrieve the backup item 230-2. FIG. 2C depicts the housekeeping queue 140 with the new entry 144 that corresponds to the backup item 230-2. The entry 144 includes the identifier BI-2, the low priority value, and the total unshared chunk size of 63 GB associated with the backup item 230-2.

The prioritization instructions 124 may prioritize the deletion of the backup items based on the priority value and total unshared chunk size stored in the housekeeping queue 140. For example, the prioritization instructions 124 may prioritize backup items corresponding to entries including the low priority value for deletion before the backup items corresponding to the entries including the high priority value. For ease of explanation, the backup items associated with entries including the low priority value may be referred to as "low priority backup items" and the backup items associated with entries including high priority value may be referred to as "high priority backup items". In some examples, the prioritization instructions 124 may identify the entries including the low priority value in the housekeeping queue 140. In some examples, the identification may include sorting the housekeeping queue 140 according to the priority value such that the entries including the low priority value are positioned before the entries including the high priority value in the housekeeping queue 140. FIG. 2D depicts the housekeeping queue 140 after sorting according to the priority value. The entries 144, 141, which include the low priority value, are positioned before the entries 143, 142, which include the high priority value.

The delete instructions 126 may delete, from the system 100, the backup items corresponding to the entries 144, 141 including the low priority value in the housekeeping queue 140. In the example of FIG. 2D, the delete instructions 126 may delete the low priority data entities, identified by the identifiers BI-2 and BI-13 of entries 144 and 141, from the housekeeping directory 290. For example, the delete instructions 126 may select the entry at the top of the sorted housekeeping queue (i.e., entry 144) and initiate a deletion of the corresponding backup item (e.g., backup item 230-2). In some examples, the deletion may include a chunk deletion procedure (e.g., performed as a background operation), which may include identifying chunks referenced by the associated backup item. Based on the identified chunks, the procedure may further include deleting each chunk referenced exclusively by the associated backup item, without deleting any chunk referenced by any other backup item of backup items 230. For example, the delete instructions 126 may select the backup item 230-2, and delete each chunk referenced exclusively by the backup item 230-2, without deleting any chunk referenced by any other backup item of the backup items 230 (e.g., backup items 230-1, 230-3, etc.).

As depicted in FIG. 2A and described above, the backup item 230-2 includes the manifest 232-2, which references chunk signature SIG-2 in container index 261, which represents chunk 202 in the container 271. In the examples described herein, a backup item may be said to "reference" a given chunk in a given container when the manifest includes (or otherwise references) the chunk signature for the given chunk in the container index for the given container. In such examples, the delete instructions 126 may determine that backup item 230-2 references the chunk 202 of the container 271, based on the manifest 232-2 referencing chunk signatures SIG-2 in the container index 261. In such examples, as may be seen in FIG. 2A, chunk 202 may be referenced exclusively by the backup item 230-2 (i.e., as it is not referenced by any other backup item of backup items 230) because SIG-2 has a reference count of one. In such examples, the delete instructions 126 may initiate a chunk deletion procedure to delete the chunk 202 in response to the request 151.

In some examples, the delete instructions 126 may decrement a reference count in the container index 261 for each chunk signature of the container index that is referenced by the backup item 230-2. In the example of FIG. 2E, delete instructions 126 may decrement the reference count for chunk signature SIG-2 from one to zero. In such examples, the delete instructions 126 may walk the manifest 232-2, and when the delete instructions 126 arrive at the chunk signature SIG-2 (referring to the container index 261), the delete instructions 126 may decrement the reference count of the container index entry 261-2 for the chunk signature SIG-2 from one to zero, as depicted in FIG. 2E. In some examples, in response to a determination that the reference count of SIG-2 has become zero after decrementing (i.e., the chunk 202 is referenced exclusively by backup item 230-2), the delete instructions 126 may initiate a chunk deletion procedure to delete the chunk 202. For example, the delete instructions 126 may proceed to erase the chunk 202 based on the chunk location data 252 indicated in the container index 261.

In some examples, the delete instructions 126 may decrement reference counts for chunks referenced exclusively by backup item 230-2 and for chunks also referenced by other backup item(s). The delete instructions 126 may then proceed to the next chunk signature in the manifest 232-2, if any, and arrive at that chunk signature in the container index and may decrement the reference count of container index entry for that chunk signature. For example, if the manifest 232-2 referenced the chunk signature SIG-1, then the instructions may decrement the reference count for SIG-1 from two to one in the container index 261. In such an example, the delete instructions 126 may not delete the chunk 201 referenced by the chunk signature SIG-1 because the reference count of the chunk signature SIG-1 is not zero (i.e., the chunk is referenced by another backup item).

In some examples, the delete instructions 126 may also delete the manifest 232-2 for the backup item 230-2 from the deduplication store 200. As noted above, the manifest 232-2 may include a priority value, total unshared chunk size, and chunk signatures (e.g., SIG-2) that represent chunks (e.g., 202) that make up the data stream 150 represented by the backup item 230-2. In such examples, any other (or all) manifests of backup item 230-2, if any, may be erased along with manifest 232-2. In the example of FIG. 2A, after manifest 232-2 is deleted, the backup item 230-2 no longer references those chunk signatures, because the manifest 232-2 of backup item 230-2 that referenced those chunks has been deleted. Further, the backup item 230-2 itself may be deleted.

In some examples, the delete instructions 126 may delete container index entries containing reference counts of zero. For example, after the delete instructions 126 decrement reference counts based on the delete request 151, as described above, the delete instructions 126 may identify the container index entry 261-2 in container index 261 as having a reference count of zero as shown in FIG. 2E. In such examples, the container index entry 261-2 may be deleted from the container index 261.

The delete instructions 126 may delete other low priority backup items in a similar manner as described above. FIG. 2F depicts a housekeeping directory 290 after deleting the low priority backup items. The delete instructions 126 may remove the entries 141, 144 including low priority value (LOW) and the total unshared chunk size (63 GB and 83 GB) from the housekeeping queue 140, as depicted in FIG. 2G. In response to deleting each low priority backup item and removing the entries associated with the each low priority backup item, the low priority backup items cannot be restored.

At this point, the housekeeping directory 290 may include high priority backup items as depicted in FIG. 2F and the housekeeping queue 140 may include entries associated with high priority backup items (as the low priority backup items have been deleted) as depicted in FIG. 2G. In some examples, the prioritization instructions 124 may determine whether sufficient storage capacity is available in the deduplication system 100. For example, the prioritization instructions 124 may determine whether the available storage capacity is below a threshold or not. In response to determining that the available storage capacity is below the threshold, the delete instructions 126 may delete a high priority backup item indicated in the housekeeping queue 140. In some examples, the delete instructions 126 may identify an entry including the largest total unshared chunk size. The identification may include sorting the housekeeping queue in descending order of the total unshared chunk sizes. FIG. 2H depicts the housekeeping queue 140 according to a descending order of the total unshared chunk size. The entry 143 is positioned first or top of the housekeeping queue as it is associated with the backup item (identified by BI-30) having the largest total unshared chunk size of 108 GB in the housekeeping queue 140.

The delete instructions 126 may initiate the delete procedure, which includes deleting chunk(s) exclusively referenced by the corresponding backup item (identified by BI-30), removing a corresponding entry from the container index, and deleting the identifier BI-30 of the backup item identified by BI-30 from the housekeeping directory 290. The delete instructions 126 may also remove the entry 143 from the housekeeping queue 140. FIGS. 2I and 2J depict the housekeeping directory 290 and the housekeeping queue 140 after deleting the high priority backup item with the largest total unshared chunk size. The prioritization instructions 124 may determine again whether the available storage capacity is below the threshold or not (i.e., whether there is sufficient storage capacity available or not). If the available storage capacity is not below the threshold, then the delete instructions 126 may not perform the delete operation for the high priority backup item identified by BI-11. In some examples, the delete instructions 126 may not perform the deletion unless the available storage capacity is below the threshold.

In some examples, entries in the housekeeping queue 140 may include a time threshold value for the backup items associated with the high priority value (as described earlier in relation to FIG. 1J-1N. The time threshold value may be received from the client computing device coupled to the deduplication system 100 or inputted manually via a user interface (e.g., Graphical User Interface) of the deduplication system. On expiry of the time threshold value, the priority value of that backup item may be modified to the low priority value. For example, the prioritization instructions 124 may determine whether time elapsed after the insertion of the entry into the housekeeping queue is equal to or greater than the time threshold value. If the time elapsed is equal to or greater than the time threshold value for the entry, the prioritization instructions 124 may modify the priority value of the entry from a high priority value to a low priority value. As a result, the high priority backup item may be treated as a low priority backup item. In such examples, the delete instructions 126 may prioritize the deletion of such backup item from the deduplication system 100 as described above.

In some examples, the deduplication system 100 may receive a restore request 152 from a client for restoring a backup item, which has been requested for deletion, but not deleted from the deduplication system 100. For example, the restore request 152 may be for restoring the backup item identified by identifier BI-11. In response to the restore request, the restore instructions 128 may determine whether the entry associated with the backup item (identified by BI-11) is in the housekeeping queue 140 or not. If the entry is in the housekeeping queue 140, the restore instructions 128 may move a reference to the backup item (identified by the identifier BI-11) from the housekeeping directory 290 to the user-accessible location. For example, the restore instructions 128 may move the identifier BI-11 of the backup item identified by BI-11 to a live root structure (not shown in FIG. 2A) in the deduplication system 100. In response to moving the identifier BI-11 of the backup item identified by BI-11 from the housekeeping directory 290, the restore instructions 128 may remove the entry associated with the backup item identified by BI-11 from the housekeeping queue 140. After restoring the backup item identified by BI-11, the deduplication system 100 may provide an indication 153 ("RESTORE COMPLETE") that restoration is completed to the client.

Figure 3A:
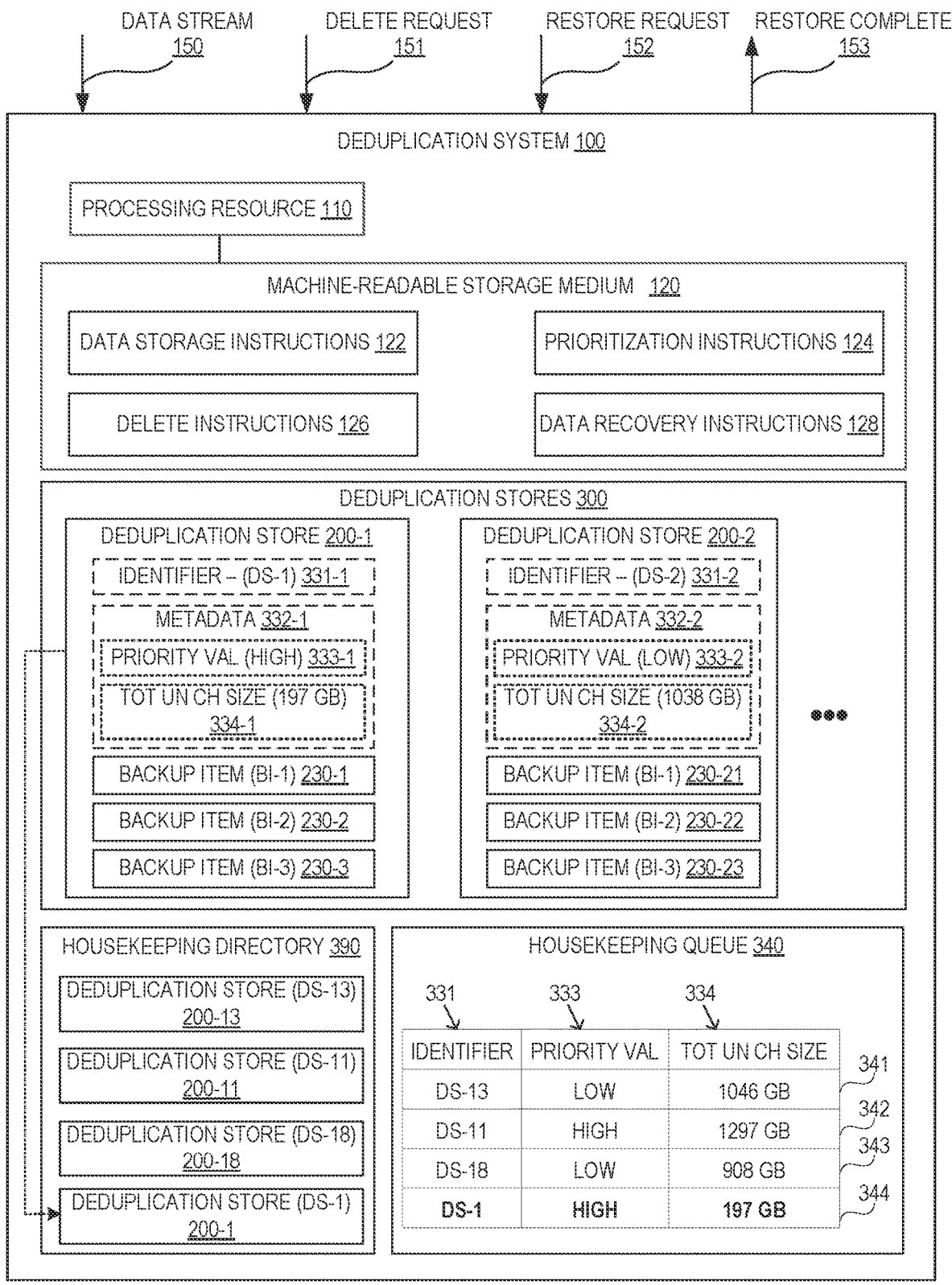
FIG. 3A is a block diagram of a deduplication system that is to delete deduplication stores, in accordance with an example.

FIG. 3A is a block diagram depicting a deduplication system 100 that is to delete deduplication stores, in accordance with another example. The deduplication system 100, the processing resource 110, the machine-readable medium 120, may be analogous to the deduplication system described in relation to FIGS. 1A and 2A. The deduplication store 300 may be a parent deduplication store directory including a number of root deduplication store directories 200-1, 200-2, etc., which are analogous to the deduplication store 200 of FIG. 2A. The root deduplication store directories (referred to herein as deduplication stores 200-1, 200-2, etc.,) may include a number of backup items, which may be analogous to the backup items 230-1, 230-2, etc., of FIG. 2A.

In the example of FIG. 3A, the deduplication system 100 may receive the data stream 150 associated with a user object from the client. As described in relation to FIG. 1A and FIG. 2A, the data storage instructions 122 (e.g., when executed by the processing resource 110) may perform a deduplication process and store chunks of the data stream in the container(s) of one of the deduplication stores 200-1, 200-2, etc., and may store chunk signatures and chunk location data for each of the chunks in container index(es) corresponding to the container(s) of that deduplication store 200-1, 200-2, etc. The data storage instructions 122 may store the deduplicated form of the data stream as a backup item 230-1, 230-2, etc., where each backup item corresponds to a user object. The data storage instructions 122 may store a collection of backup items in a common root deduplication store directory. In the example of FIG. 3A, the data storage instructions 122 may store backup items 230-1, 230-2, 230-3 in the deduplication store directory 200-1 and the backup items 230-21, 230-22, 230-23 in the deduplication store directory 200-2, etc. The deduplication store 200-1 may include an identifier (DS-1) 331-1, metadata 332-1 including priority value (LOW) 333-1 and total unshared chunk size (197 GB) 334-1. Similarly, the deduplication store 200-2 may include an identifier (DS-2) 331-1, metadata 332-2 including priority value (LOW) 333-2 and total unshared chunk size (1038 GB) 334-2.

The deduplication system 100 may receive a delete request 151 including a request to delete one of the deduplication stores 200-1, 200-2, etc. In response to receiving the delete request 151, the prioritization instructions 124 may move the deduplication store from the parent deduplication store 300 to a store housekeeping directory 390 (referred to herein as housekeeping directory 390) and may insert a new entry into the store housekeeping queue 340 (referred to herein as housekeeping queue 340). The housekeeping queue 340 may include an identifier 331, a priority value 333, and a total unshared chunk size 334 of the deduplication stores to be deleted from the deduplication system 100. In the example of FIG. 3A, the priority values 333 may be values (e.g., from a predetermined set of possible values, such as "high" and "low") set by a user, such as an owner of the deduplication store. The total unshared chunk size associated with the deduplication store may be a sum of the total unshared chunk size associated with each backup item of the plurality of backup items in that deduplication store. The total unshared chunk size associated with the each backup item may be a sum of chunk size of each chunk exclusively referenced by the backup item.

In one example, in response to a delete request 151 to delete deduplication stores (in the deduplication stores 300), the prioritization instructions 124 may move the deduplication stores to the root housekeeping directory 390. In some examples, moving the deduplication store may include moving each of the directories, sub-directories, files, etc., under that root directory of that deduplication store to the housekeeping directory 390. In other examples, one or more sub-directories, files, etc., under the root directory of the deduplication store may be moved to the housekeeping directory 390. In one example, moving the deduplication store may include moving the identifier, metadata, backup items to the housekeeping directory 390. After the deduplication store is moved to the housekeeping directory 390, the client may not be able to view, open, read, and/or retrieve the deduplication store. Further, the prioritization instructions 124 may include the identifier 331, priority values 333, and total unshared chunk size 334 associated with each deduplication store in the respective entries of the housekeeping queue 340.

Continuing with the example of FIG. 3A, the request 151 may include a request to delete the deduplication store 200-1. The prioritization instructions 124 may move the deduplication store 200-1 to the housekeeping directory 390 (as shown using by the dotted arrow) and insert a new entry 344 including the identifier, priority value, and the total unshared chunk size for the deduplication store to the housekeeping queue 340. FIGS. 3B and 3C depict the housekeeping directory 390 and the housekeeping queue 340 in response to the delete request 151 for deleting the deduplication store 200-1. In the example of FIG. 3A, the housekeeping directory 390 may store the deduplication stores 200-13, 200-11, 200-18 that are to be deleted. The housekeeping queue 340 may maintain entries 341, 342, 343 corresponding to those deduplication stores, each entry including an identifier, priority value, and total unshared chunk size of a corresponding deduplication store. The entry 341 includes the identifier DS-13, priority value (LOW), total unshared chunk size (1046 GB); entry 342 includes the identifier DS-11, priority value (HIGH), total unshared chunk size (1297 GB); entry 343 includes the identifier DS-18, priority value (LOW), total unshared chunk size (908 GB); and entry 344 includes the identifier DS-1, priority value (HIGH), total unshared chunk size (197 GB).

The prioritization instructions 124 may prioritize the deletion of the deduplication store based on the priority value associated with the deduplication store. In some examples, the prioritization instructions 124 may (e.g., as part of the background process) select, from housekeeping queue 340, entries including a low priority value for deletion of the corresponding deduplication stores. In some examples, the prioritization instructions 124 may sort the housekeeping queue 340 according to the priority value such that the entries including the low priority value are positioned before the entries including the high priority value in the housekeeping queue 340. The prioritization instructions 124 may, after the sorting, rearrange the entries such that the entries, which include the low priority value, are positioned before the entries, which include the high priority value. FIG. 3D depicts a housekeeping queue after sorting according to the priority value. As shown, the prioritization instructions 124 may position the entries 341, 343 having low priority before the entries 344, 342 having the high priority.

The deduplication stores associated with entries including low priority value may be referred to as "low priority deduplication stores" and the deduplication stores associated with entries including high priority value are referred to as "high priority deduplication stores". The delete instructions 126 may initiate deletion of the low priority deduplication stores (i.e., the deduplication stores associated with the entries 341, 343 including the low priority value in the housekeeping queue 340 in FIG. 3D) from the system 100. For example, the delete instructions 126 may delete the deduplication stores from the housekeeping directory 390 that corresponds to the first entry (i.e., entry at the top) of the housekeeping queue 340. For example, the delete instructions 126 may determine that the entry 341 is at the top of the housekeeping queue 340 and therefore delete the deduplication store 200-13 corresponding to that entry 341 from the housekeeping directory 390. After deleting the deduplication store 200-13, the delete instructions 126 may remove the corresponding entry 341 including the identifier DS-13 from the housekeeping queue 340. In a similar manner, the delete instructions 126 may delete other low priority deduplication stores (e.g., deduplication store 200-18) from the deduplication system 100. FIGS. 3E and 3F are block diagrams of the housekeeping directory 390 and the housekeeping queue 340 after deletion of the low priority deduplication stores and removal of entries corresponding to the low priority deduplication stores. At this point, the housekeeping directory 390 may include high priority deduplication stores (e.g., 200-1, 200-11) and the housekeeping queue 340 may include entries (344, 342) associated with high priority deduplication stores (as the low priority backup deduplication stores have been deleted).

In response to deleting the low priority deduplication stores (200-13, 200-18) and removal of the entries (341, 343) from the housekeeping queue 340, the prioritization instructions 124 may determine whether sufficient storage capacity is available in the deduplication system 100. For example, the prioritization instructions 124 may determine whether the available storage capacity is below a threshold or not. In response to determining that the available storage capacity is below the threshold, the delete instructions 126 may delete a high priority deduplication store. In some examples, the delete instructions 126 may identify a high priority deduplication store and the largest total unshared chunk size. The identification may include sorting the housekeeping queue in descending order of the total unshared chunk size (as depicted in FIG. 3G). The entry 342 may be positioned first or top of the housekeeping queue 340 as it is associated with the deduplication store 200-11 having the largest total unshared chunk size ("1297 GB").

The delete instructions 126 may select the entry 342 and initiate the delete operation, which includes deleting deduplication store 200-11 from the housekeeping directory 390 and removing the entry 342 including identifier DS-11 from the housekeeping queue 340. FIGS. 3H and 3I depict the housekeeping directory 390 and the housekeeping queue 340 after deleting the high priority deduplication store having largest total unshared chunk size. The prioritization instructions 126 may determine further whether the available storage capacity is below the threshold or not (i.e., whether there is sufficient available storage capacity available or not). If the available storage capacity is not below the threshold, then the delete instructions 126 may not perform the deletion for the deduplication store 200-1. In other examples, the delete instructions 126 may perform the deletion for the deduplication store 200-1 if storage capacity is insufficient.

In some examples, entries in the housekeeping queue 340 may include a time threshold value for the deduplication stores associated with the high priority value (as described earlier in relation to FIG. 1J-1N). The time threshold values may be received as an input to the deduplication system 100 from the client. On expiry of the time threshold value, the priority value of that deduplication store may be modified to a low priority value. For example, the prioritization instructions 124 may determine whether time elapsed after the insertion of the entry into the housekeeping queue is equal to or greater than the time threshold value. If the time elapsed is equal to or greater than the time threshold value for the entry, the prioritization instructions 124 may modify the priority value of the entry from a high priority value to a low priority value. In such examples, the delete instructions 126 may prioritize the deletion of the deduplication store from the deduplication system 100.

In some examples, the deduplication system 100 may receive a restore request 152 from a client for restoring a deduplication store, which has been requested for deletion, moved to the housekeeping directory 390, but not deleted from the deduplication system 100. For example, the request 152 may be to restore the deduplication store 200-1 from the housekeeping directory 390 depicted in FIG. 3I. In response to the request 152, the restore instructions 128 may move the deduplication store 200-1 from the housekeeping directory 390 to the user-accessible location. For example, the restore instructions 128 may move the deduplication store 200-1 to a live root directory (not shown in FIG. 3A) in the deduplication system 100. In response to moving the deduplication store from the housekeeping directory 390, the restore instructions 128 may remove the entry 344 associated with the deduplication store from the housekeeping queue 340. After restoring the deduplication store, the deduplication system 100 may provide an indication 153 ("RESTORE COMPLETE") that the restoration is completed to the client.

Figure 4:
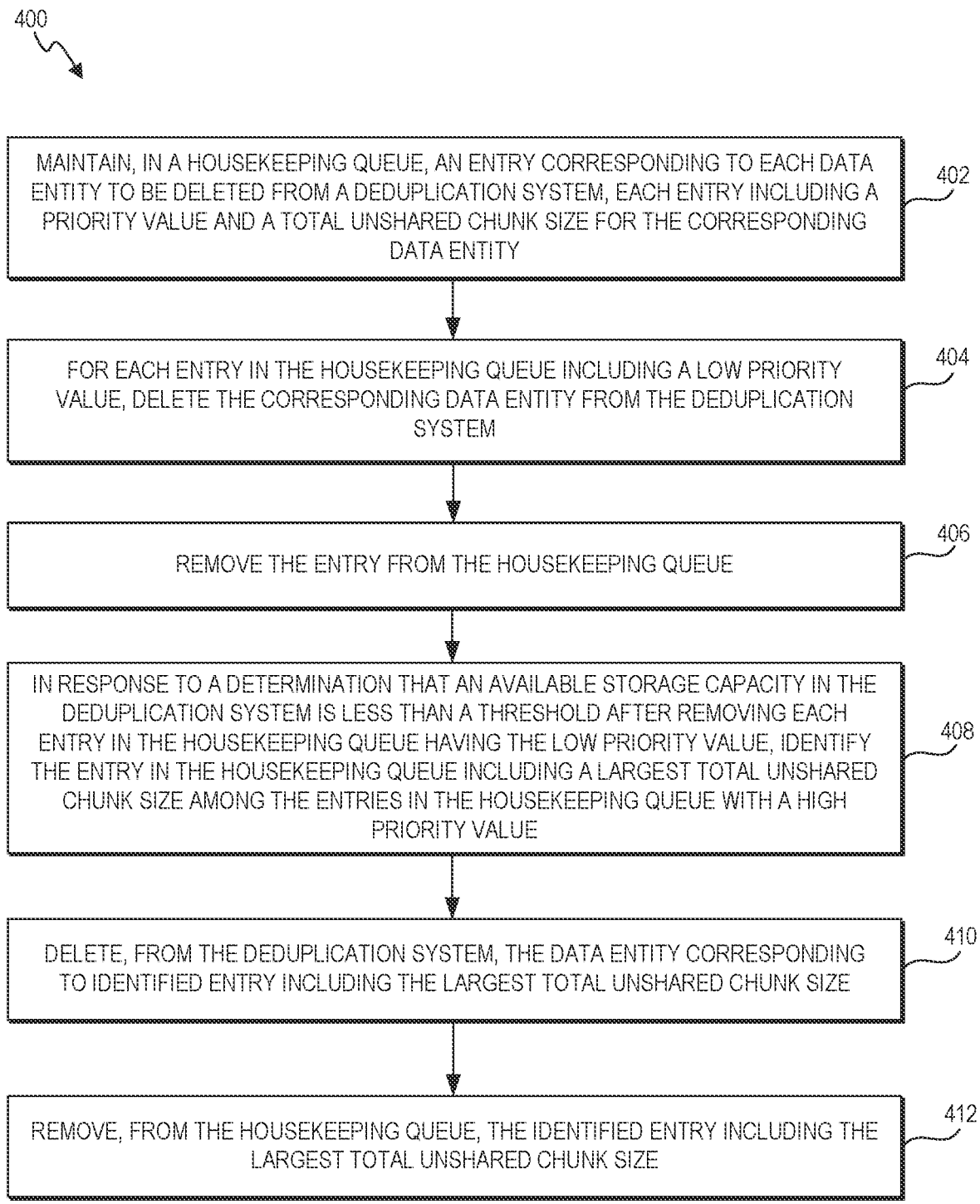
FIG. 4 is a flowchart of a method for prioritized deletion of data entities in a deduplication system, in accordance with an example.
Figure 5:
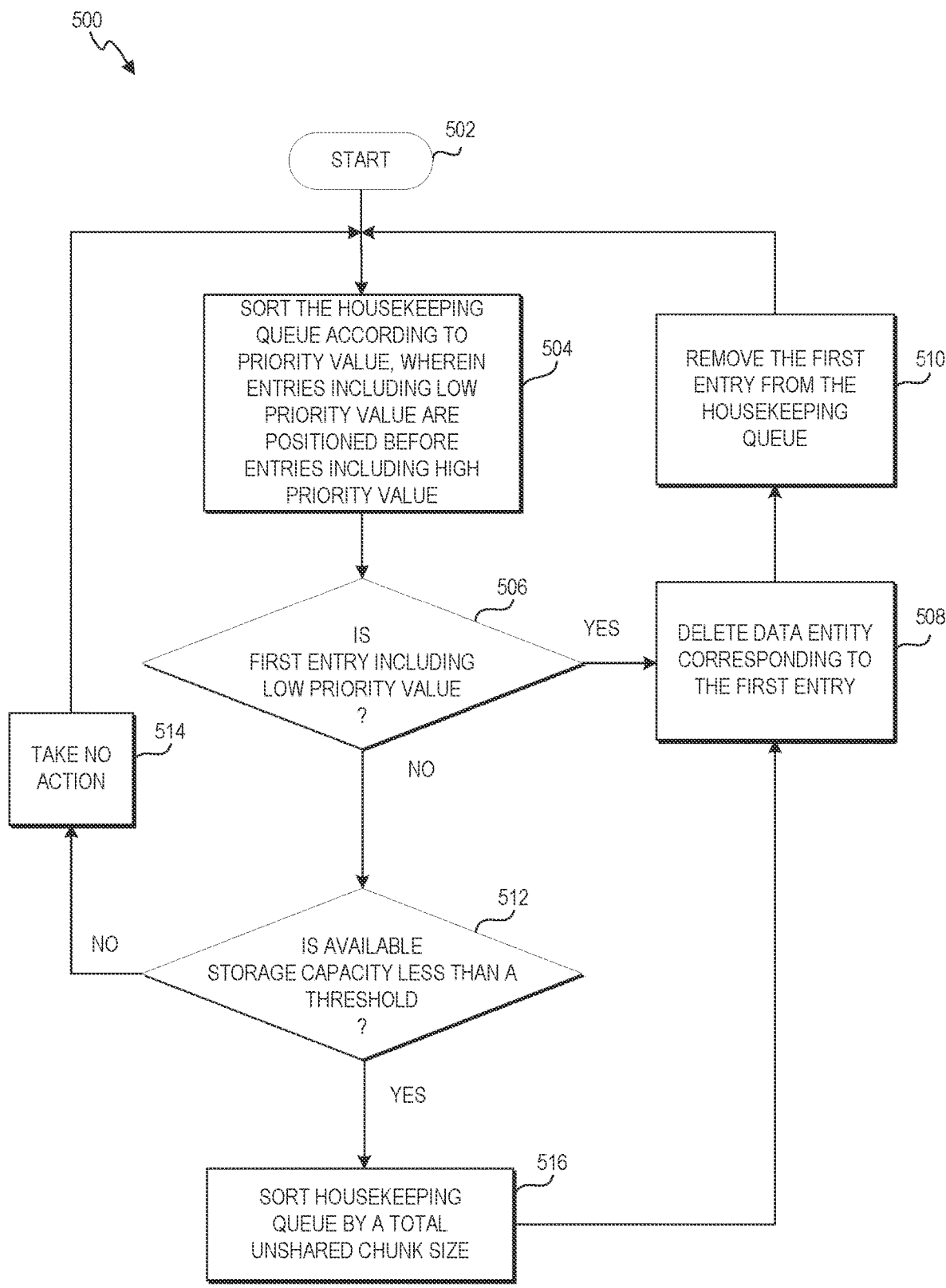
FIG. 5 is a flowchart of a method for prioritized deletion of data entities in a deduplication system, in accordance with another example.

FIGS. 4 and 5 are flowcharts of methods 400 and 500 for deletion of data entities in a deduplication system, in accordance with some examples. Although execution of methods 400 and 500 are described below with reference to the deduplication system 100 of FIG. 1A, other computing devices suitable for the execution of methods 400 and 500 may be utilized (e.g., deduplication system 100 of FIGS. 2A and 3A, etc.). Additionally, implementation of the methods 400 and 500 is not limited to such examples. Although each of the flowcharts of FIGS. 4 and 5 shows a specific order of performance of certain functionalities, the methods 400 and 500 are not limited to such order. For example, the functionalities shown in succession in the flowcharts may be performed in a different order, may be executed concurrently or with partial concurrence, or a combination thereof.

At 402 of method 400, instructions 124 of deduplication system 100 (e.g., when executed by at least one processing resource 110) may maintain entries including priority values and total unshared chunk sizes associated with each data entity, which is requested for deletion, in a housekeeping queue. For example, the processing resource 110 (e.g., of FIG. 1A) may receive a request for deleting a data entity 130 stored in the deduplication system 100. In response to receiving the request, an identifier, priority value, and total unshared chunk size of the data entity 130 may be included in an entry in the housekeeping queue. As described earlier, the priority value in the entry may indicate whether the corresponding data entity is a high priority data entity or a low priority data entity. For examples, a data entity corresponding to an entry including low priority value may be a low priority data entity and a data entity corresponding to an entry including a high priority value may be high priority data entity.

At 404, instructions 126 may delete low priority data entities from the deduplication system 100. For example, the instructions 126 may identify entries including the low priority values in the housekeeping queue and deleting the data entities associated with those entries. After deleting the low priority data entities, at 406, instructions 126 may remove the entries of the low priority data entities from the housekeeping queue.

In response to deleting the low priority data entities and removing the entries associated with the low priority data entities from the housekeeping queue, at 408, instructions 124 may determine whether the available storage capacity is less than the threshold or not. If the available storage capacity is less than the threshold, instructions 124 may identify the entries including largest total unshared chunk size in the housekeeping queue.

At 410, instructions 126 may delete the high priority data entity associated with the largest total unshared chunk size from the deduplication system. At 412, instructions 126 may remove the entry of the high priority data entity associated with the largest total unshared chunk size from the housekeeping queue.

FIG. 5 depicts a method for deletion of data entities in a deduplication system, in accordance with another example. At 502, the method 500 starts and proceeds to 504. At 504, instructions 124 sort the housekeeping queue 140 (e.g., of FIG. 1) according to the priority value. For example, the instructions 124 may rearrange the queue such that entries including the low priority value are ordered for deletion prior to the entries including the high priority value.

At 506, instructions 124 may determine whether the first entry in the sorted housekeeping queue includes low priority value or not. In response to determining that the first entry includes the low priority value ("YES" at 506), at 508, instructions 126 may delete the data entity associated with the first entry. Deleting the data entity may include deleting the chunks associated with the data entity (as described in relation to FIG. 2A) or deleting the deduplication store from the housekeeping directory (as described in relation to FIG. 3A).

At 510, instructions 126 may remove the first entry including from the housekeeping queue after deleting the data entity from the deduplication system. The method 500 may proceed to 504 from 510. The method 500 may include performing the method blocks 506, 508, and 510 for each entry in the housekeeping queue that includes the low priority value. In this manner, the method 500 performs prioritized deletion of the data entities including the low priority value.

In response to deleting each data entity associated with the low priority value, instructions 124 may determine whether a data entity associated with the high priority value has to be deleted or not. For example, if the first entry in the sorted housekeeping queue does not include low priority value ("NO" at block 506), then instructions 124 may determine whether available storage capacity is less than a threshold available storage capacity or not. In response to determining that the available storage capacity is not less than a threshold available storage capacity ("NO" at 512), the method 500 may not perform any action at 514 and sort the housekeeping queue at 504 in the next iteration. In some examples, at 514, the method 500 may be paused for a predetermined period (e.g., 10 seconds, 30 seconds, or the like).

In response to determining that the available storage capacity is less than a threshold ("YES" at 512), the method 500 may proceed to 516 to sort the housekeeping queue according to total unshared chunk size included in each entry such that the entry including the largest total unshared chunk size is prioritized for deletion. For example, in the sorted housekeeping queue, the first entry may include the largest total unshared chunk size. The instructions 126 may select the first entry and perform the deletion process as described earlier with respect to 508 and 510. For example, at 508, instructions 126 may delete the data entity associated with the first entry, which is associated with high priority value and the largest total unshared chunk size. Further, instructions 126 may remove the entry including the largest total unshared chunk size from the housekeeping queue. The deletion of the data entity associated with high priority value and largest total unshared chunk size may increase the available storage capacity to allow ingestion of new data streams in the deduplication system 100.

In the examples described herein, the phrase "based on" is not exclusive and should not be read as "based exclusively on". Rather, the phrase "based on" as used herein is inclusive and means the same as the alternative phrasing "based at least on" or "based at least in part on". As such, any determination, decision, comparison, or the like, described herein as "based on" a certain condition, data, or the like, may be understood to mean that the decision, comparison, or the like, is based at least on (or based at least in part on) that condition, data, or the like, and may also be based on other condition(s), data, or the like. In the examples described herein, functionalities described as being performed by "instructions" may be understood as functionalities that may be performed by those instructions when executed by a processing resource. In other examples, functionalities described in relation to instructions may be implemented by one or more engines, which may be any combination of hardware and programming to implement the functionalities of the engine(s).

As used herein, a "computing device" may be a server, storage device, storage array, desktop or laptop computer, switch, router, or any other processing device or equipment including a processing resource. In the examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In the examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1A, 2A, and 3A, storage medium 120 may be implemented by one machine-readable storage medium, or multiple machine-readable storage media.

In the examples described herein, a storage array may be a computing device comprising a plurality of storage devices and one or more controllers to interact with host devices and control access to the storage devices. In some examples, the storage devices may include HDDs, SSDs, or any other suitable type of storage device, or any combination thereof. In some examples, the controller(s) may virtualize the storage capacity provided by the storage devices to enable a host to access a virtual object (e.g., a volume) made up of storage space from multiple different storage devices.

In some examples, the functionalities described above in relation to instructions described herein may be implemented by one or more engines which may be any combination of hardware and programming to implement the functionalities of the engine(s). In the examples described herein, such combinations of hardware and programming may be implemented in a number of different ways. For example, the programming for the engines may be processor-executable instructions stored on at least one non-transitory machine-readable storage medium, and the hardware for the engines may include at least one processing resource to execute those instructions. In some examples, the hardware may also include other electronic circuitry to at least partially implement at least one of the engine(s). In some examples, the at least one machine-readable storage medium may store instructions that, when executed by the at least one processing resource, at least partially implement some or all of the engine(s). In such examples, a computing device may include the at least one machine-readable storage medium storing the instructions and the at least one processing resource to execute the instructions. In other examples, the engine may be implemented by electronic circuitry.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In the examples described herein, a machine-readable storage medium or media may be part of an article (or article of manufacture). An article or article of manufacture may refer to any manufactured single component or multiple components. In some examples, instructions may be part of an installation package that, when installed, may be executed by a processing resource to implement functionalities described herein. All of the features disclosed in this specification (including any accompanying claims, abstract, and drawings), and/or all of the elements of any method or process so disclosed, may be combined in any combination, except combinations where at least some of such features and/or elements are mutually exclusive. For example, functionalities described herein in relation to any of FIGS. 1A-5 may be provided in combination with functionalities described herein in relation to any other of FIGS. 1A-5.

What is claimed is:

1. An article comprising a non-transitory machine-readable medium storing instructions executable by a processing resource of a deduplication system to:
   maintain, in a housekeeping queue, an entry corresponding to each data entity to be deleted from the deduplication system, each entry including a priority value and a total unshared chunk size for the corresponding data entity;
   for each entry in the housekeeping queue including a low priority value:
      delete the corresponding data entity from the deduplication system; and
      remove the each entry from the housekeeping queue; and
   in response to a determination that an available storage capacity in the deduplication system is less than a threshold after removing the each entry in the housekeeping queue having the low priority value:
      identify the entry in the housekeeping queue including a largest total unshared chunk size among the entries in the housekeeping queue with a high priority value;
      delete, from the deduplication system, the data entity corresponding to the identified entry including the largest total unshared chunk size; and
      remove, from the housekeeping queue, the identified entry including the largest total unshared chunk size.

2. The article of claim 1, wherein the instructions include instructions to:
   insert a predetermined time threshold value to one or more entries including the high priority value; and
   in response to an expiry of the predetermined time threshold value after the insertion, modify, in the one or more entries, the high priority value to the low priority value.

3. The article of claim 1, wherein the instructions to delete the corresponding data entity from the deduplication system comprises:
   sort the housekeeping queue based on the priority value, such that entries including the low priority value are positioned before the entries including the high priority value;
   select the entry positioned first in the housekeeping queue; and
   in response to a determination that the selected entry includes the low priority value, delete the corresponding data entity from the deduplication system.

4. The article of claim 1, wherein the instructions to identify the entry in the housekeeping queue including the largest total unshared chunk size among the entries in the housekeeping queue with the high priority value include instructions to:
   sort the housekeeping queue according to the total unshared chunk size, such that the entry including the largest total unshared chunk size is positioned first in the housekeeping queue; and
   select the entry positioned first in the housekeeping queue for deletion, wherein the entry corresponds to a data entity with the largest total unshared chunk size.

5. The article of claim 1, wherein the instructions include instructions to:
   in response to a request to delete a backup item of the deduplication system, the backup item comprising one of the data entities:
      move a reference to the data entity from a user-accessible directory to a housekeeping directory, wherein the housekeeping directory is not accessible to a client.

6. The article of claim 5, wherein the instructions include instructions to:
- in response to a request to restore the backup item, determine whether the entry corresponding to the backup item is in the housekeeping queue; and
- in response to a determination that the entry corresponding to the backup item is in the housekeeping queue:
  - move the reference to the backup item from the housekeeping directory to the user-accessible directory; and
  - remove the entry corresponding to the backup item from the housekeeping queue.

7. The article of claim 1, wherein the instructions to delete include instructions to:
- identify, based on one or more manifests of a backup item, a group of chunks stored in one or more containers of a deduplication store, wherein the one or more manifests include references to one or more container indexes and one or more chunk signatures; and
- delete the group of chunks from the one or more containers.

8. The article of claim 7, wherein the instructions to identify the group of chunks include instructions to:
- select the one or more container indexes containing the one or more chunk signatures referenced by the backup item; and
- identify, in the one or more container indexes, chunk location data in the one or more containers using the one or more chunk signatures.

9. The article of claim 8, wherein the instructions to delete the group of chunks include instructions to:
- decrement, in the one or more container indexes, a reference count of each of the one or more chunk signatures referenced by the backup item; and
- in response to the one or more chunk signatures having the reference count of zero, perform a chunk deletion procedure.

10. The article of claim 1, wherein the total unshared chunk size for a backup item is a sum of chunk size of each chunk exclusively referenced by the backup item.

11. A method comprising:
- maintaining, in a housekeeping queue, an entry corresponding to each deduplication store to be deleted from a deduplication system, each entry including a priority value and a total unshared chunk size for the corresponding deduplication store;
- for each entry in the housekeeping queue including a low priority value:
  - deleting the corresponding deduplication store from the deduplication system; and
  - removing the each entry from the housekeeping queue; and
- in response to a determination that an available storage capacity in the deduplication system is less than a threshold after removing the each entry in the housekeeping queue having the low priority value:
  - identifying the entry in the housekeeping queue including a largest total unshared chunk size among the entries in the housekeeping queue with a high priority value;
  - deleting, from the deduplication system, the deduplication store corresponding to the identified entry including the largest total unshared chunk size; and
  - removing, from the housekeeping queue, the identified entry including the largest total unshared chunk size.

12. The method of claim 11, further comprising:
- receiving a request to delete the deduplication store from the deduplication system;
- in response to the request, moving a root directory of the deduplication store from a user-accessible directory to a housekeeping directory, wherein the housekeeping directory is not accessible to a client.

13. The method of claim 12, wherein deleting the deduplication store comprises deleting the root directory of the deduplication store from the housekeeping directory.

14. The method of claim 12, further comprising:
- receiving a request to restore the deduplication store in the housekeeping directory;
- determining whether the entry corresponding to the deduplication store is in the housekeeping queue; and
- in response to a determination that the entry corresponding to the deduplication store is in the housekeeping queue:
  - moving the root directory of the deduplication store from the housekeeping directory to the user-accessible directory; and
  - removing the entry corresponding to the deduplication store from the housekeeping queue.

15. The method of claim 11, wherein the deduplication store includes a plurality of backup items, and wherein the total unshared chunk size for the deduplication store is a sum of the total unshared chunk size for each backup item of the plurality of backup items, and wherein the total unshared chunk size for the each backup item is a sum of chunk size of each chunk exclusively referenced by the backup item.

16. The method of claim 11, wherein deleting the corresponding deduplication store from the deduplication system comprises:
- sorting the housekeeping queue based on the priority value, such that entries including the low priority value are positioned before the entries including the high priority value;
- selecting the entry positioned first in the housekeeping queue; and
- in response to a determination that the entry includes the low priority value, deleting the corresponding deduplication store from the deduplication system.

17. A computing device comprising:
- at least one processing resource; and
- at least one non-transitory machine-readable storage medium comprising instructions executable by the at least one processing resource to:
  - maintain, in a housekeeping queue, an entry corresponding to each data entity to be deleted from a deduplication system, each entry including a priority value and a total unshared chunk size for the corresponding data entity;
  - for each entry in the housekeeping queue including a low priority value:
    - delete the corresponding data entity from the deduplication system; and
    - remove the each entry from the housekeeping queue; and
  - in response to a determination that an available storage capacity in the deduplication system is less than a threshold after removing the each entry in the housekeeping queue having the low priority value:
    - identify the entry in the housekeeping queue including a largest total unshared chunk size among the entries in the housekeeping queue with a high priority value;

delete, from the deduplication system, the data entity corresponding to the identified entry including the largest total unshared chunk size; and remove, from the housekeeping queue, the identified entry including the largest total unshared chunk size.

18. The computing device of claim 17, wherein to delete a backup item, the at least one processing resource executes instructions to:

identify, based on one or more manifests of the backup item, a group of chunks stored in one or more containers of a deduplication store, wherein the one or more manifests include references to one or more container indexes and to one or more chunk signatures; and delete the group of chunks from the one or more containers.

19. The computing device of claim 18, wherein to identify the group of chunks, the at least one processing resource executes instructions to:

select the one or more container indexes containing the one or more chunk signatures referenced by the backup item; and identify, in the one or more container indexes, chunk location data in the one or more containers using the one or more chunk signatures.

20. The computing device of claim 19, wherein to delete the group of chunks, the at least one processing resource executes instructions to:

decrement, in the one or more container indexes, a reference count of each of the one or more chunk signatures referenced by the backup item; and in response to the one or more chunk signatures having the reference count of zero, perform a chunk deletion procedure.

* * * * *